US012110196B2

(12) United States Patent
Hollestelle

(10) Patent No.: US 12,110,196 B2
(45) Date of Patent: Oct. 8, 2024

(54) STACK MANIPULATING SYSTEM AND CORRESPONDING METHOD

(71) Applicant: G.J. HOLLESTELLE BEHEER B.V., Broek op Langedijk (NL)

(72) Inventor: Gerard Jan Hollestelle, Broek op Langedijk (NL)

(73) Assignee: G.J. HOLLESTELLE BEHEER B.V., Broek op Langedijk (NL)

( * ) Notice: Subject to any disclaimer, the term of this patent is extended or adjusted under 35 U.S.C. 154(b) by 0 days.

(21) Appl. No.: 18/022,200

(22) PCT Filed: Aug. 26, 2021

(86) PCT No.: PCT/EP2021/073659
§ 371 (c)(1),
(2) Date: Feb. 20, 2023

(87) PCT Pub. No.: WO2022/043462
PCT Pub. Date: Mar. 3, 2022

(65) Prior Publication Data
US 2023/0303343 A1    Sep. 28, 2023

(30) Foreign Application Priority Data
Aug. 28, 2020  (EP) ..................... 20193453

(51) Int. Cl.
*B65G 59/02*     (2006.01)
*H01M 10/06*     (2006.01)
*H01M 10/04*     (2006.01)

(52) U.S. Cl.
CPC ........... *B65G 59/02* (2013.01); *H01M 10/06* (2013.01); *B65G 2201/022* (2013.01); *B65G 2207/40* (2013.01); *H01M 10/0404* (2013.01)

(58) Field of Classification Search
CPC .... B65G 2207/40; B65G 59/02; B65G 61/00; B65G 2201/022; F16P 1/00; H01M 10/06; H01M 10/0404; Y02E 60/10; Y02P 70/50
See application file for complete search history.

(56) References Cited

U.S. PATENT DOCUMENTS

| | | | |
|---|---|---|---|
| 4,854,815 A * | 8/1989 | Augst .................... | B65H 5/006 271/157 |
| 5,011,467 A * | 4/1991 | Traegaardh ............. | B65B 69/00 414/412 |

(Continued)

FOREIGN PATENT DOCUMENTS

| | | |
|---|---|---|
| CN | 205122722 U | 3/2016 |
| CN | 110371695 A | 10/2019 |

(Continued)

OTHER PUBLICATIONS

PCT International Search Report and Written Opinion dated Nov. 22, 2021, for International Application No. PCT/EP2021/073659.

*Primary Examiner* — Gregory W Adams
(74) *Attorney, Agent, or Firm* — Patterson + Sheridan, LLP

(57) ABSTRACT

The present invention relates to a stack manipulating system configured to move a stack of plates, in particular lead battery plates, from at least one arrival location to at least one target location at a machine where the plates are to be processed, and wherein the stack manipulating system comprises: -a first zone comprising the at least one arrival location and a non-static moving assembly having a range of motion, wherein the complete range of motion is located within the first zone, -a second zone comprising the at least one target location and the machine, wherein the second zone is configured to accommodate an operator, a separation, separating the second zone from the first zone, the separation being configured for preventing the operator to move into the first zone, -at least one conveyor traversing the separation, the at least one conveyor comprising an entrance in at least one intermediate location located in the first zone and an exit located in the second zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone.

25 Claims, 9 Drawing Sheets

(56) References Cited

U.S. PATENT DOCUMENTS

| | | | | |
|---|---|---|---|---|
| 5,190,430 | A | * | 3/1993 | Neri ...................... B65B 43/185 |
| | | | | 414/412 |
| 5,275,527 | A | * | 1/1994 | Turra ..................... B65G 61/00 |
| | | | | 414/795.8 |
| 5,564,893 | A | * | 10/1996 | Tacchi ................... B65G 61/00 |
| | | | | 414/797 |
| 6,719,519 | B2 | * | 4/2004 | Liehs ...................... B65H 1/30 |
| | | | | 414/419 |
| 7,033,130 | B2 | * | 4/2006 | Watson .................. B65G 59/00 |
| | | | | 414/796.2 |
| 10,000,348 | B2 | * | 6/2018 | Hannessen ............. B65G 57/00 |
| 10,370,199 | B2 | * | 8/2019 | Ducharme ............. B65G 57/00 |
| 2008/0105515 | A1 | * | 5/2008 | Damick .................. A01K 1/031 |
| | | | | 901/31 |
| 2008/0150467 | A1 | * | 6/2008 | Hashimoto ................ F16P 3/12 |
| | | | | 318/568.17 |
| 2012/0175217 | A1 | * | 7/2012 | Demmeler ............... B65H 1/30 |
| | | | | 194/206 |
| 2018/0366766 | A1 | | 12/2018 | Barge |
| 2019/0062074 | A1 | * | 2/2019 | Johnson .................. B65B 5/105 |

FOREIGN PATENT DOCUMENTS

| | | |
|---|---|---|
| CN | 110980286 A | 4/2020 |
| EP | 3624245 A1 | 3/2020 |

* cited by examiner

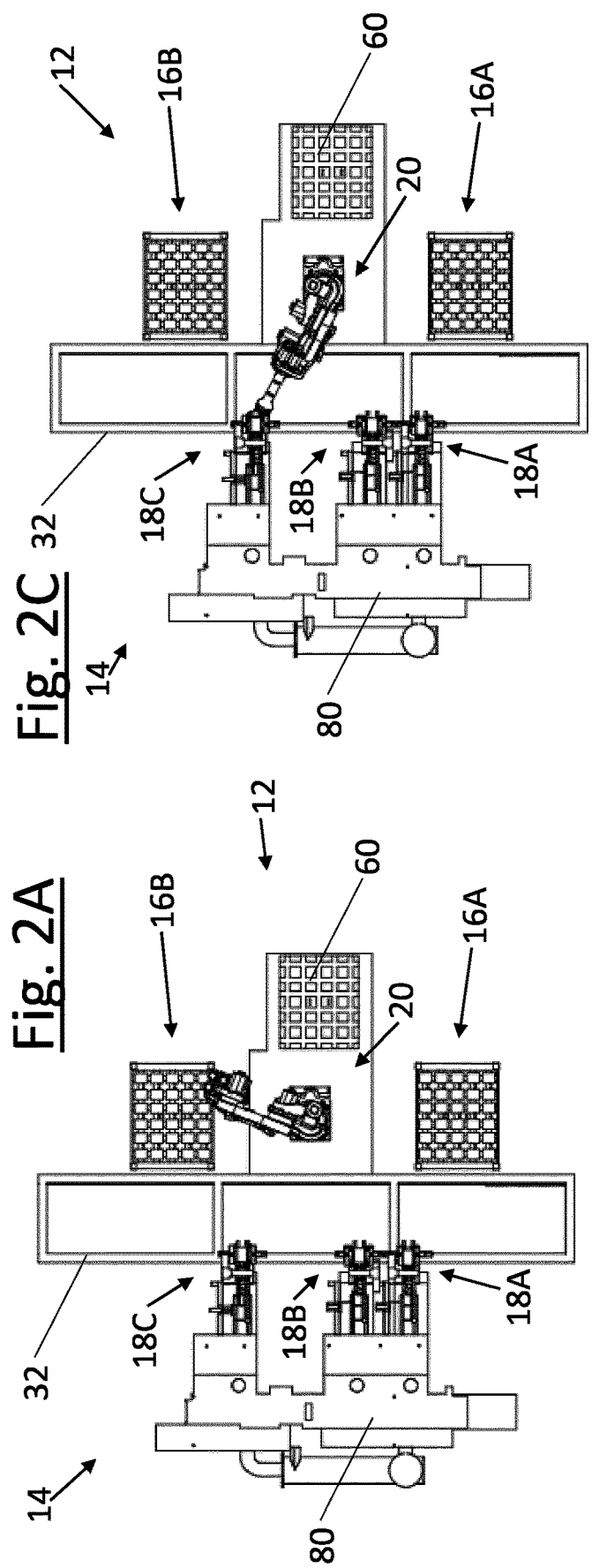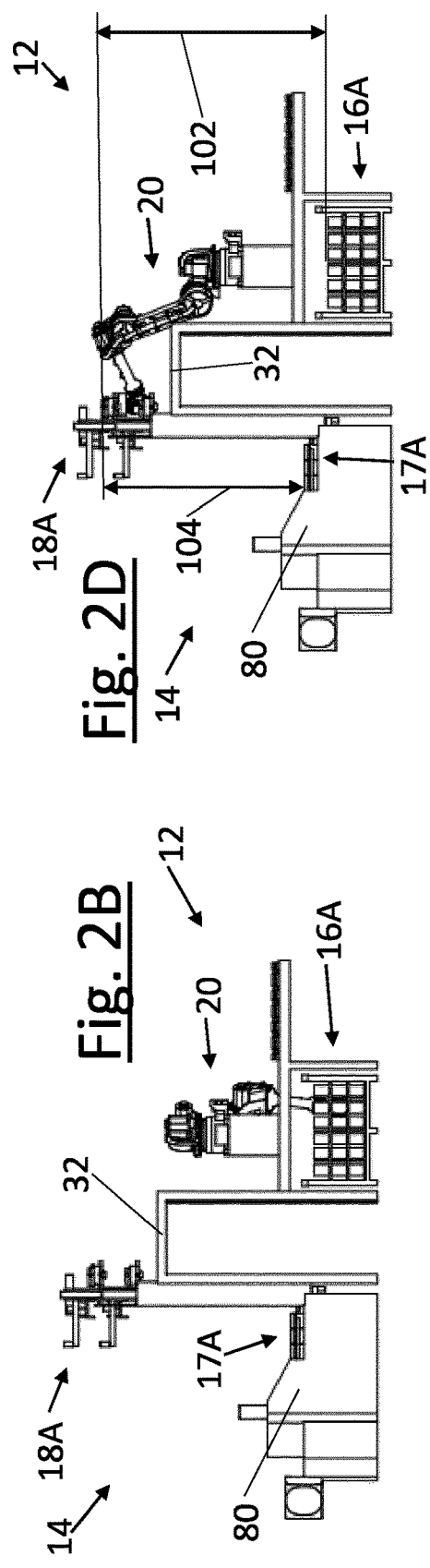

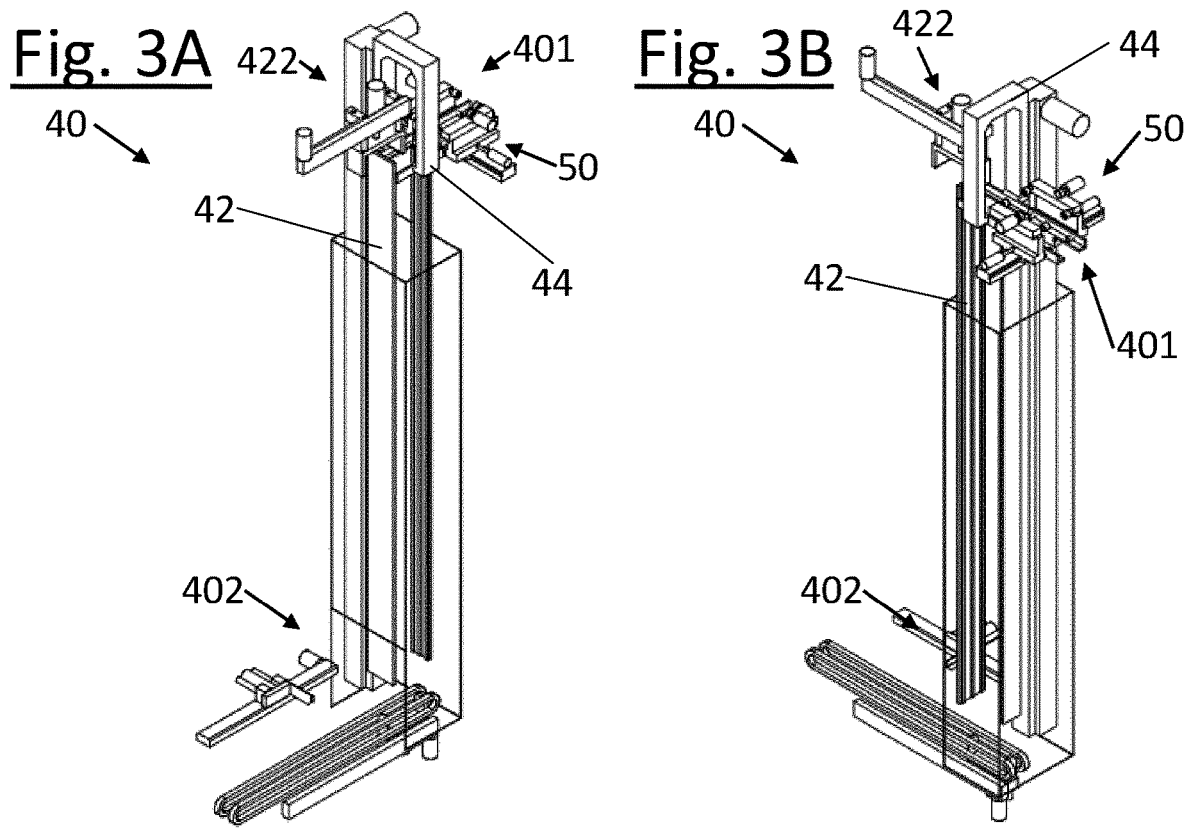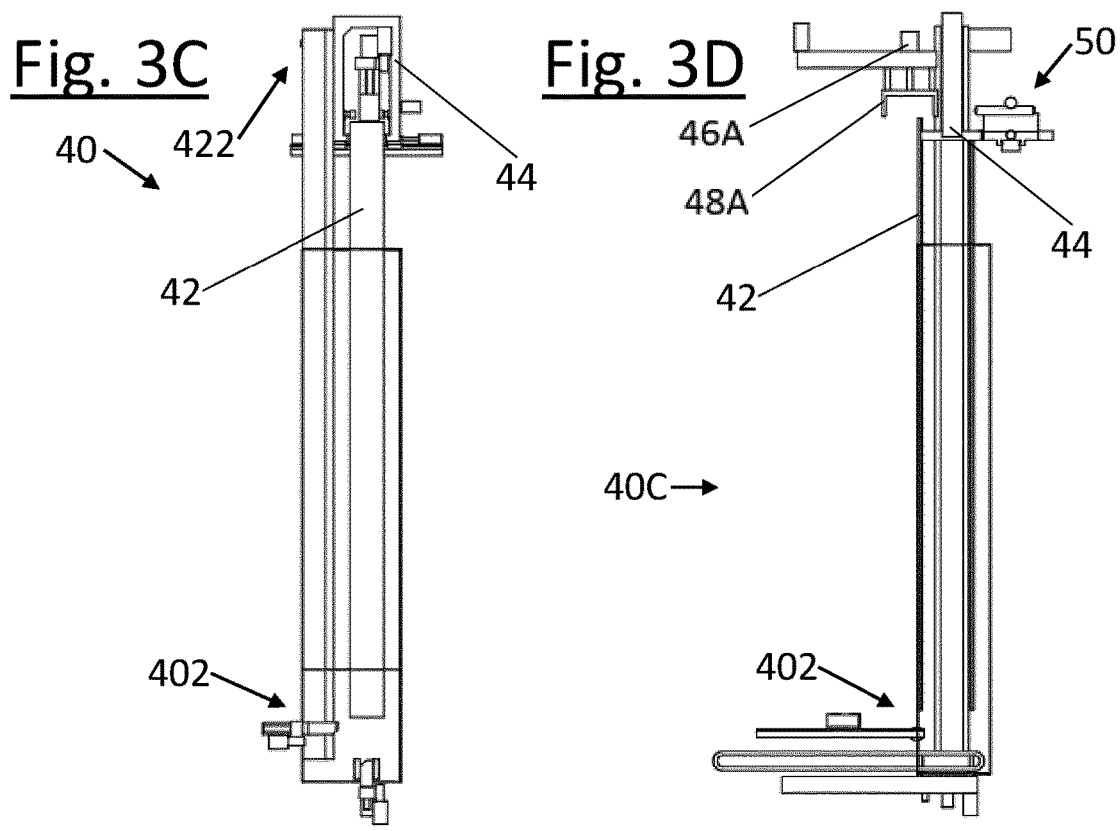

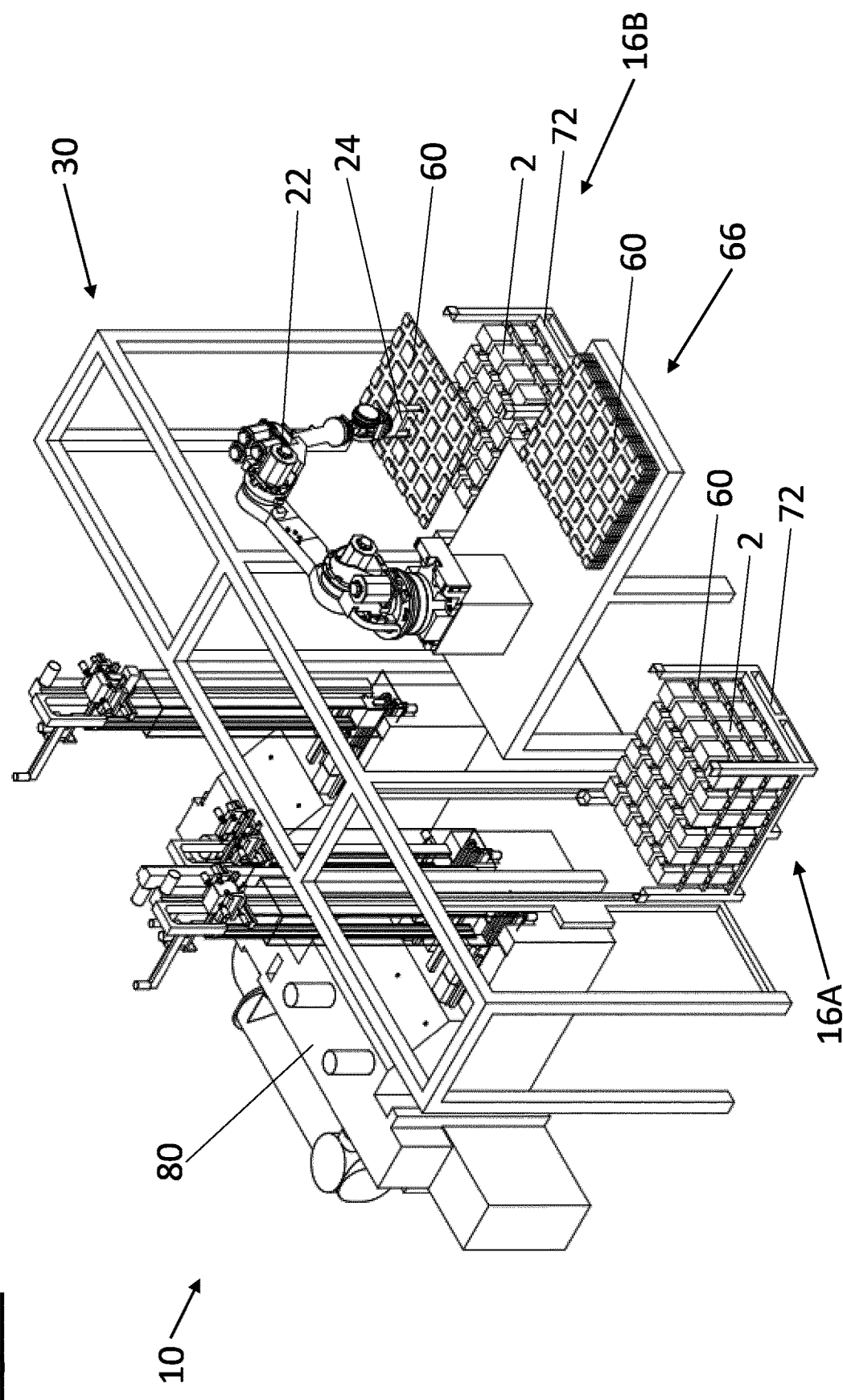

STACK MANIPULATING SYSTEM AND CORRESPONDING METHOD

FIELD OF THE INVENTION

The invention relates to the field of battery production and in particular to the field of lead-acid battery production.

BACKGROUND OF THE INVENTION

In the field of lead-acid battery production, the lead plates undergo a specific heat treatment and are subsequently placed in a battery housing. A dedicated machine, also referred to as a sandwich machine is used for the placing of the lead plates in the housing. Two types of plates are required for each battery, positive and negative plates. They are positioned in the housing in an alternating configuration, wherein each positive plate is sandwiched between two negative plates and vice versa. The dedicated machine receives a stack of positive plates and a stack of negative plates and rearranges a number of positive and negative plates into the "sandwich-configuration" prior to placement in the housing. The production process is typically a high volume process, i.e. a large number of lead plates are installed in their respective housings each single day.

The placement of the lead plates in this dedicated machine occurs manually. This job is physically quite demanding, because the individual lead plates are quite heavy. Moreover, the lead plates are typically not handled individually, but are placed in the machine in stacks comprising multiple plates. Two types of stacks are placed in the machine, stacks with positive plates and stacks with negative plates.

A problem associated with the manual placement of the stack of lead plates is the physical stress it exerts on a human operator, who has to literally move tons of lead plates each day. Despite the fact that the job of placing the stack of lead plates in the dedicated machine is physically demanding, to the best of the applicant's knowledge to date no device exists that can mechanically perform the placing of the stack of plates in the dedicated machine, thereby obviating the heavy manual labour.

The movement of objects by machines on itself is known. US2009/002868A1 discloses a device that is configured to move objects from an arrival station onto a track of rollers. An object is lifted upwards by a plurality of pins, after which a robot arm with a gripper grips the object and places it on the track of rollers.

Several factors play a role in the moving of the stacks of lead plates to the dedicated machine and the placing of the stacks of lead plates onto the dedicated machine. First, for various reasons it is generally required that an operator monitors and accesses the dedicated machine (the sandwich machine) quite regularly. For this reason, the operator generally needs to be in the vicinity of the dedicated machine constantly or at least during a significant portion of the operating time. The operator may need to move completely around the machine or at least be able to access most parts of the machine, including the platforms (or target locations) on which the two types of stacks are placed. If a stack of lead plates or an individual plate from a stack would fall on an operator, significant harm or worse may occur. Therefore, safety and reliability is a concern. A safety cage or at least some kind of protection which protects the operator against dropping plates may be required.

The required presence of the human operator for monitoring purposes may also play a role in the lack of progress in reducing the heavy manual labour. The fact that he needs to be there anyway may be a reason to let him do the work of moving the heavy plates as well.

Furthermore, the movement of the stack of plates itself may not be straightforward, because the plates may arrive in a vertical stack with the individual plates in the stack having a horizontal orientation. The dedicated machine may require that the plates are positioned on the platforms of the dedicated machine on edge, i.e. the stack is horizontal and the individual plates are oriented vertically. Hence, a reorientation of the stack of lead plates may be required.

Sometimes, some of the plates in a stack are stuck to one another. This can result in problems in the dedicated machine which rearranges the plates into a sandwich configuration because it cannot process a plate if it is stuck to another plate. Therefore, sometimes the plates need to be loosened from each other before being placed in the dedicated machine.

EP3624245A1 discloses a battery plate separator that makes use of a robot arm to pick up the plates from a pallet and move them to a separator apparatus. Here, the plates that might be sticking together can be separated before being moved to a further station.

Because the robot arm may move around freely between the stack and the machine, it can be dangerous for an operator to be in the vicinity of the robot arm while it is operational.

It appears that this total set of factors has been the cause that to date no significant progress in this field has been made. Further factors and challenges may exist as well.

OBJECT OF THE INVENTION

It is an object of the invention to provide a system that can safely and reliably move plates from one location to another location while an operator is nearby. It is a further object of the invention to provide a corresponding method.

It is a further object of the present invention to provide a system which can safely and reliably move a stack of lead plates from an arrival location to and onto a dedicated machine which is configured for placing the lead plates in the battery housing.

SUMMARY OF THE INVENTION

In a first aspect, the invention relates to a stack manipulating system configured to move a stack of plates from at least one arrival location to at least one target location at a machine where the plates are to be processed, and wherein the stack manipulating system comprises:
  a first zone comprising the at least one arrival location and a non-static moving assembly having a range of motion, wherein the complete range of motion is located within the first zone, wherein an operator may not be in the first zone when the moving assembly is in an operational state,
  a second zone comprising the at least one target location and the machine, wherein the second zone is configured to safely accommodate the operator,
  a separation, separating the second zone from the first zone,
  at least one conveyor traversing the separation, the at least one conveyor comprising an entrance in at least one intermediate location and an exit located in the second zone, wherein the at least one intermediate location is located in the first zone,
    wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone.

In doing so, an operator can safely access the machine that is located in the second zone, without being at risk of unexpectedly encountering any moving parts: the range of motion of the moving assembly is located in the first zone and the guide structure is located in the second zone and is static.

This also enables the continuous operation of the machine. If only a non-static moving assembly, e.g. a robot arm, were present to move a stack of plates between the arrival location and the target location, the non-static moving assembly should have to be shut off each time an operator must access the machine. With the system according to the invention, this is not necessary. The operator may safely access the second zone while the system is in an operational state.

In an embodiment, the moving assembly may comprise a moveable manipulator, wherein the moveable manipulator comprises an engagement member which is configured to engage the stack of plates in the at least one arrival location. The moving assembly may be configured to move the stack of plates from the at least one arrival location to the at least one intermediate location.

Such a moveable manipulator can engage the stack of plates in multiple orientations. It can engage the stack of plates from above or from below, but also from the side. In doing so, it is not a necessity that the stacks of plates always arrive in a specific orientation.

In an embodiment, the moving assembly does not comprise a guide structure which extends between the arrival location and the intermediate location.

The at least one intermediate location may be located at a first vertical distance from the at least one arrival location and at a second vertical distance from the at least one target location. The moving assembly can then be configured to move a stack of plates over the first vertical distance to the at least one intermediate location, and the at least one conveyor can be configured to move the stack of plates over the second vertical distance to the at least one target location. In such an embodiment, the moving assembly and the at least one conveyor work together to move the stack of plates past the separation and towards the machine. This way, a separation may be used to create a safe zone for an operator accessing the machine while the stacks of plates can still be transported from an arrival location to the machine.

In an embodiment, the stack manipulation system comprises at least one plate loosening device. A plate loosening device being configured to loosen plates of a stack of plates that are stuck together, particularly as a result of a heat treatment, wherein the at least one plate loosening device comprises:
- a bottom wall configured to support a stack of plates,
- at least one guide body, wherein the guide body is moveably connected to the bottom wall, and being configured to abut against the stack of plates,
- a guide body drive system being connected to the at least one guide body and comprising at least one actuator configured to move the at least one guide body,
  wherein the guide body drive system is configured to move the at least one guide body to pivot the stack of plates over an angle with respect to a neutral position, wherein the movement of the at least one guide body pivots the plates of the stack of plates, shearing the plates with respect to each other, wherein the plate loosening device is located at the entrance or at the exit of the at least one conveyor.

In a plate loosening device, the plates of the stack of plates may be oriented on edge. Such a plate loosening device can be useful because the coating of lead plates used in the production of lead-acid batteries can cause the plates to stick together. Loosening plates from one another before entering the machine prevents the machine from jamming and prevents multiple adjacent positive or negative plates being located next to each other.

The plate loosening device may comprise a wall and the actuator and guide body may accelerate and/or decelerate the stack of plates against the wall. In particular, the actuator and the guide body are configured to separate the plates of a stack by letting the stack fall freely on the wall. Herein, the height from which the plates fall is limited to a height small enough not to cause damage to the plates, but large enough to separate the plates. For example, the height may be less than 20 cm, in particular less than 10 cm, more in particular less than 3 cm.

In one embodiment, the moving assembly comprises a robot arm and the conveyor does not comprise a robot arm. By using a conveyor that is not a robot arm, the second zone may be a zone where it is safe for an operator to move around freely.

In an embodiment, the moving assembly comprises a crane.

The plate loosening device may be located at the entrance or at the exit of the at least one conveyor.

In an embodiment, the guide structure of the conveyor may comprise one or more tracks or a conveyor belt.

In an embodiment, the moving assembly does not comprise a track or conveyor belt.

In an embodiment, the moving assembly and/or the conveyor may comprise at least one rotational manipulator which provides at least one rotary degree of freedom for the stack of plates. The at least one rotational manipulator can be rotatable to change the orientation of a stack of plates between the arrival location and the target location. This negates a need for the stacks of plates to arrive in a specific orientation; the rotational manipulator can change the orientation the stack of plates has in an arrival location to an orientation desired by the machine.

In a further embodiment, the stack manipulation system further comprises the support body and a stack of plates. The support body may define a plurality of longitudinal and/or lateral slots to accommodate the moveable manipulator, allowing the manipulator to reach underneath a stack which is positioned on the body. The width of the slots may be larger than the width of the moveable manipulator. Because the slots can be both longitudinal and lateral, the moveable manipulator can engage a stack of plates from multiple directions.

In an embodiment, the support body comprises at least one recess and the moveable manipulator comprises at least one extending member, wherein the length and width of the at least one recess are larger than the length and width of the at least one extending member. The moveable manipulator is configured to engage the support body at least through the at least one recess to move the support body from an arrival position to a support body storage position.

In an embodiment, the at least one conveyor comprises an elevator and the intermediate location may be located at an upper extremity or at a lower extremity of the guide structure and the target location is located at an opposite extremity of the guide structure. An elevator can be a useful part of the conveyor because the elevator does not comprise moving parts that are accessible to an operator while the stack manipulating system is operational. This increases the safety of the operator.

The elevator may comprise an elevator system to separate the plates of a stack by accelerating and/or decelerating the stack of plates against a fixed structure. In particular, the elevator system is configured to separate the plates of a stack by letting the stack fall freely on a bottom wall. Herein, the height from which the plates fall is limited to a height small enough not to cause damage to the plates, but large enough to separate but plates. For example, the height may be less than one meter, in particular 50 centimetre.

In an embodiment, the at least one conveyor may comprise at least one actuator and at least one intermediate body. The at least one actuator and the at least one intermediate body are configured to move a stack of plates from the at least one intermediate location into the at least one conveyor and/or to move the stack of plates out of the at least one conveyor. In particular, the at least one actuator and the at least one intermediate body may be configured to move the stack of plates into the elevator and/or out of the elevator. The at least one actuator and the at least one intermediate body may also be configured to directly feed a stack of plates into the machine. The use of at least one intermediate body and at least one actuator makes that the stack of plates can be moved from an arrival location to the machine without human interference.

In an embodiment, a continuous mover, such as a walking beam, may move the stack of plates between the moving assembly and the conveyor.

In an embodiment, the separation comprises a protection fence with overhang to accommodate the operator. In such an embodiment, the moving assembly and the conveyor are configured to move the stack of plates over the protection fence. A fence may be an open structure such as a wire fence, but may also be a closed structure, e.g. made with plate material or may be a wall. The latter may also protect an operator against falling particles that are smaller than a stack of plates or robot arm, e.g. dust or coating particles. The use of a fence with overhang creates a zone in the second zone that is safe for the operator, i.e. the operator is safe from moving objects coming from above and from the side.

In an embodiment, the separation comprises a passage and a blocking member that is moveable between a blocking state blocking the passage and non-blocking state allowing an operator to move from the first zone to the second zone when the moving assembly is in an idle state. In particular the blocking member may be a door.

In another embodiment, the separation may comprise a floor of a building, wherein the first zone is located on the floor of the building and the second zone is located on a lower floor of the building.

The separation may comprise a floor of a building, wherein the second zone is located on the floor of the building and the first zone is located on a lower floor of the building.

By placing the arrival location on another floor than the machine, the arrival location may be approached from all directions instead of only from one side. The latter being the case when the arrival location and the machine are on the same floor.

In an embodiment, the stack manipulation system may further comprise a pallet transport assembly. A pallet may support stacks of plates in the at least one arrival position and the pallet transport assembly may comprise a pallet conveyor configured to move pallets to and away from the arrival location.

In an embodiment, the machine is a battery plate arranging device, the battery plate arranging device comprising at least a first target location for a stack of plates of a first kind and a second target location for a stack of plates of a second kind. The battery plate arranging device may comprise a first positioning assembly and a second positioning assembly that alternatively position plates of the first kind and the second kind behind each other, creating a stack of alternating plates of the first kind and plates of the second kind. The machine may also comprise a conveyor configured to move a stack of alternating plates out of the machine after having been arranged to be installed in a battery.

In another aspect, the invention relates to a method for manipulating a stack of plates configured to move a stack of plates from at least one arrival location to at least one target location at a machine, and wherein the stack manipulating system comprises:
a first zone comprising the at least one arrival location and a moving assembly and a complete range of motion of the moving assembly, wherein an operator may not be in the first zone when the moving assembly is in an operational state,
a second zone comprising the at least one target location and the machine, wherein the second zone is configured to safely accommodate the operator,
a separation, separating the first zone from the second zone,
at least one conveyor extending through or over the separation, the at least one conveyor comprising an entrance in at least one intermediate location and an exit located at the at least one target location, wherein the intermediate location is located in the first zone,
wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, the method comprising the steps:
a) engaging the stack of plates with the moving assembly in the at least one arrival location in the first zone,
b) moving the stack of plates from the at least one arrival location to the at least one intermediate location in the first zone with the moving assembly,
c) moving the stack of plates from the at least one intermediate location to the at least one target location in the second zone with the at least one conveyor, wherein the moving assembly comprises moving parts, and wherein the moving parts stay outside the second zone.

In an embodiment, the moving assembly may comprise a moveable manipulator, wherein the moveable manipulator comprises an engagement member which, during step a), engages the stack of plates in the at least one arrival location. Subsequently, during step b), the moving assembly may move the stack of plates from the at least one arrival location to the at least one intermediate location.

In an embodiment, the at least one intermediate location is located at a first vertical distance from the at least one arrival location and a second vertical distance from the at least one target location. During step b) the moving assembly may move a stack of plates over the first vertical distance to the at least one intermediate location, and during step c) the at least one conveyor may move the stack of plates over the second vertical distance to the at least one target location. The moving assembly and the at least one conveyor may work together to move the stack of plates past the separation and towards the machine.

In an embodiment, the stack manipulation system comprises at least one plate loosening device, wherein the plate loosening device loosens the plates of a stack from each other before arriving at the at least one target location in case the plates are stuck to each other. The at least one plate loosening device may comprise:
- a bottom wall configured to support a stack of plates,
- at least one guide body, wherein the guide body is moveably connected to the bottom wall, and being configured to abut against the stack of plates,
- a guide body drive system being connected to the at least one guide body and comprising at least one actuator configured to move the at least one guide body,
  wherein the guide body drive system is configured to move the at least one guide body to pivot the stack of plates over an angle with respect to a neutral position, wherein the movement of the at least one guide body pivots the plates of the stack of plates, shearing the plates with respect to each other, wherein the plate loosening device is located at the entrance or at the exit of the at least one conveyor.

In an embodiment, the moving assembly comprises a robot arm and the conveyor does not comprise a robot arm.

In an embodiment, the moving assembly and/or the conveyor may comprise at least one rotational manipulator which provides at least one rotary degree of freedom. The moving assembly and/or the conveyor may change the orientation of a stack of plates after engaging the stack of plates.

In an embodiment, the moving assembly may move a support body from an arrival position to a support body storage position.

These and other aspects of the invention will be more readily appreciated as the same becomes better understood by reference to the following detailed description and considered in connection with the accompanying drawings in which like reference symbols designate like parts.

BRIEF DESCRIPTION OF THE FIGURES

FIGS. 2A-2D depict top views and side views of an embodiment of the invention in two different positions.

FIGS. 3A-3D show different views of an embodiment of the conveyor.

FIG. 6 shows another embodiment of the invention in isometric view.

DETAILED DESCRIPTION OF THE FIGURES

Figure 1A:
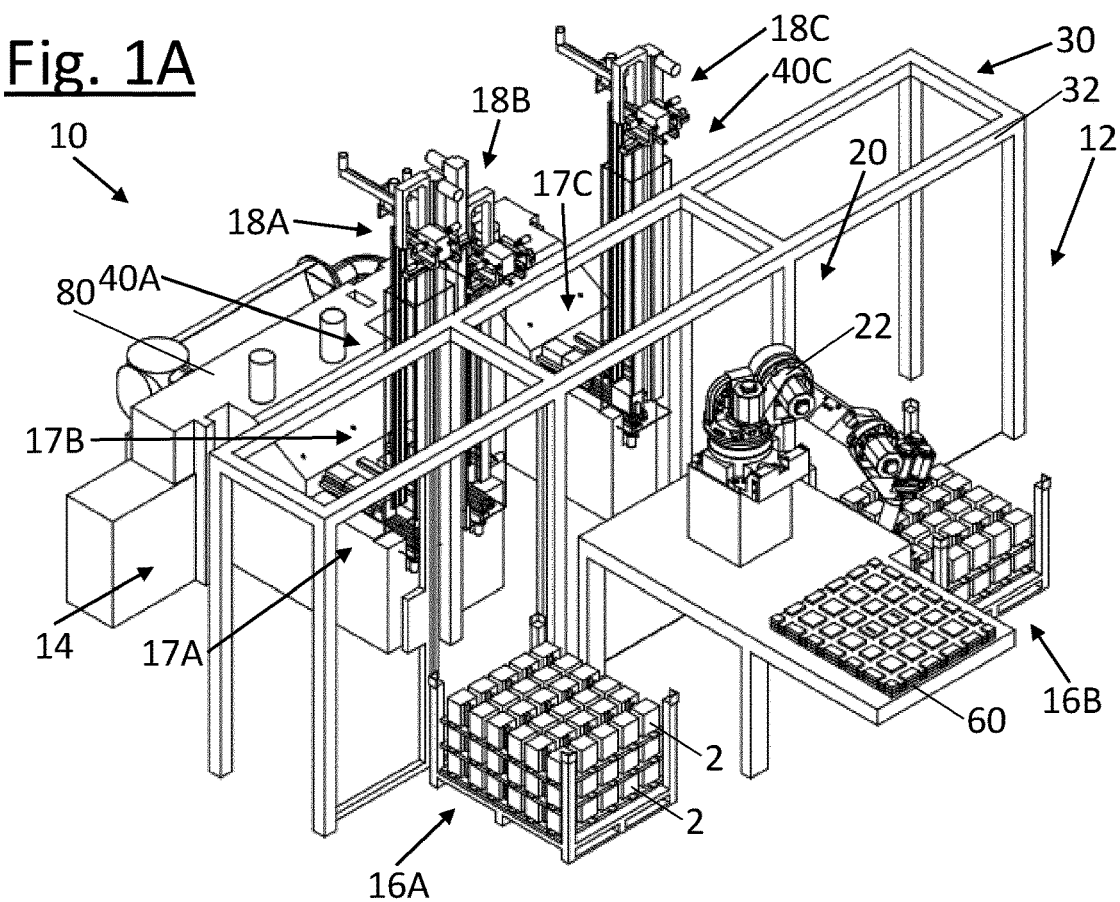
FIGS. 1A and 1B depict an embodiment of the invention in two different positions in isometric view.
Figure 1B:
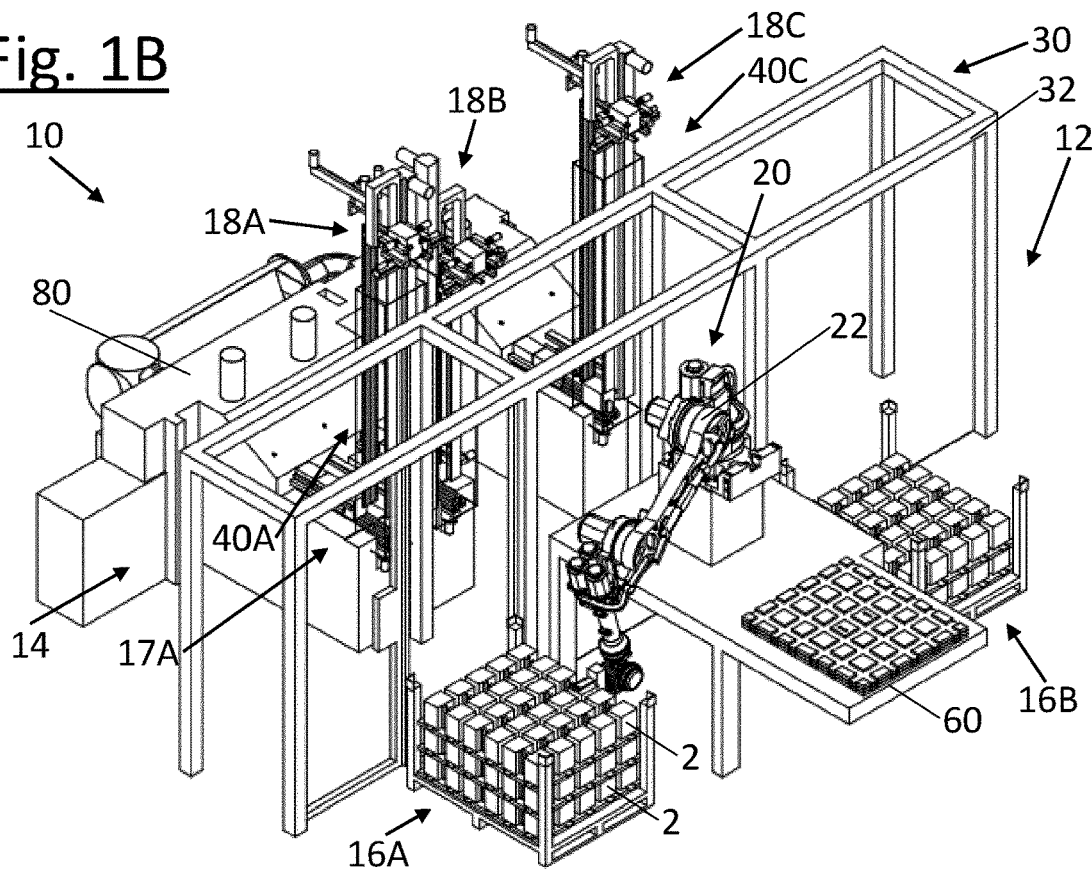

FIGS. 1A, 1B, 2A, 2B, 2C, and 2D depict different views of an embodiment of a stack manipulating system 10 configured to move a stack of plates 2 from an arrival location 16A, 16B to a target location 17A, 17B, 17C at a machine 80 where the plates of the stack of plates will be processed.

The depicted machine 80 is a so-called sandwich machine that is configured to rearrange stacks of plates 2 into alternating positive and negative plates before feeding the alternating plates into a housing. Two types of plates are required for each battery; positive and negative plates. They are positioned in the housing in an alternating configuration, wherein each positive plate is sandwiched between two negative plates and vice versa. The machine 80 receives a stack of positive plates and a stack of negative plates and rearranges a number of positive and negative plates into the "sandwich-configuration" prior to placement in the housing. A different type of plates must arrive at each target location 17A, 17B, 17C for the machine 80 to be able to create the desired, rearranged sandwiches of plates.

The positive and negative plates also arrive at different arrival locations 16A, 16B. This reduces the complexity of the movement of the moving assembly and reduces the chances of errors occurring due to the placement of one type of plates at the wrong target location 17A, 17B, 17C at the machine 80.

A first zone 12 is shown comprising arrival locations 16A, 16B and a moving assembly 20. In the arrival location 16A, 16B a stack of plates 2 is located on a support body 60. The complete range of motion of the moving assembly 20 is located in the first zone 12. An operator may not be present in the first zone when the moving assembly 20 is in an operational state. In this embodiment, the moving assembly comprises a robot arm 22 comprising multiple rotational manipulators that provide a rotary degree of freedom for the stack of plates.

A second zone 14 is shown comprising target locations 17A, 17B, 17C and the machine 80. An operator is free to safely move around in the second zone, because a separation 30 separates the first zone 12, comprising the moving assembly, from the second zone 14. In the depicted embodiment, the separation 30 comprises a fence with overhang 32, wherein the second zone 14 comprises the area below the overhang. Herein, the fence with overhang 32 is the part between the area below the overhang and the first zone.

The separation may comprise a second fence (not depicted) on the side of the second zone, wherein an operator may move in the area below the overhang between the fence with overhang and the second fence, and wherein the operator may move between the second zone around the machine and the second zone in the area below the overhang. The fence with overhang and the second fence may comprise wire fencing, plate fencing, or a different type of fencing. In the figures, the fence is depicted as see-through. Additionally, the separation 30 may comprise a blockable passage, for example a door. In that way, when the moving assembly is idle, an operator may freely move between the first zone 12 and the second zone 14.

In order for a stack of plates to be moved between an arrival location 16A, 16B and a target location 17A, 17B, 17C, conveyors 40A, 40B (depicted in FIG. 5), 40C traverse the separation.

FIGS. 3A-3D shows the conveyor in greater detail.

Each conveyor (generally denoted by 40, and in particular 40C in FIG. 3D) comprises an entrance 401 that is located in an intermediate location 18A, 18B, 18C (depicted in FIGS. 1 and 2) that is located in the first zone 12 and an exit 402 that is located in the second zone 14. The conveyor defines a trajectory between the entrance 401 and the exit 402 and comprises a guide structure 42 which extends between the entrance and the exit along the trajectory. The guide structure 42 guides the stack of plates along said trajectory and is a static structure in the second zone 14. In this embodiment, the conveyor does not comprise a robot arm. In this embodiment, a plate loosening device 50 is located at the entrance 401 of the conveyor, it will be understood that the plate loosening device may also be located at the exit 402 of the conveyor.

Referring to FIGS. 2A-2D, in the depicted embodiment, the intermediate location 18C is located at a first vertical distance 102 from the arrival location 16B and at a second vertical distance 104 from the target location 17C. The robot arm 22 is configured to move a stack of plates 2 over the first vertical distance 102 to the intermediate location 18C and the conveyor 40C is configured to move the stack of plates over the second vertical distance to 104 the target location 17C. Herein, the moving assembly and the at least one conveyor work together to move the stack of plates past the separation and towards the machine. This movement is shown in FIG. 2A-2D, wherein FIGS. 2A and 2B show the situation wherein the stack of plates is engaged in the arrival location 16B and FIGS. 2C and 2D shows the situation wherein the stack of plates has been moved to the intermediate location 18C. Hereafter, the conveyor 40C will move the stack over the second vertical distance 104 towards the machine 80.

To this end, the conveyor 40 comprises an elevator 44. The intermediate location is located at an upper extremity 422 of the guide structure 42 comprising a track and the target location 17A, 17B, 17C is located at an opposite extremity of the guide structure.

To move a stack of plates into the elevator 44 the conveyor 40 comprises an actuator 46A and an intermediate body 48A (shown in FIG. 3D). The actuator 46A and the intermediate body 48A are configured to move a stack of plates 2 from the intermediate position 18 into the conveyor.

FIGS. 4A-4L depict the step-by-step process of a stack being manipulated between an arrival location 16A, 16B and a target location 17A, 17B, 17C from different views.

Figure 4A:
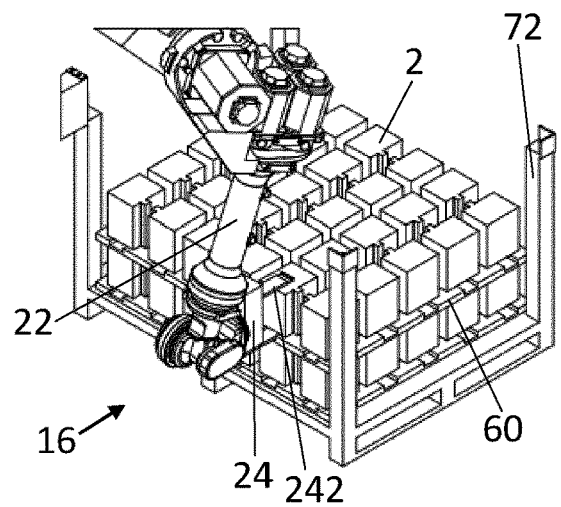
FIGS. 4A-4L show various positions of various components of an embodiment, depicting a process according to an embodiment.

FIG. 4A shows a stack of plates 2 located on a support body 60 being engaged by a moveable manipulator 24 of the robot arm 22 of the moving assembly 20. In particular, the stack of plates 2 is being clamped by the extending member 242. The support bodies 60 and the stacks of plates 2 are supported by a pallet 72.

Figure 4B:
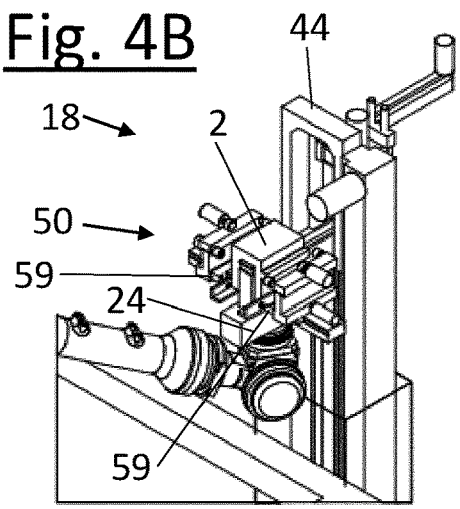

Turning to FIG. 4B, the moving assembly has moved the stack of plates 2 to the intermediate location 18. The orientation of the stack of plates 2 has changed and the moveable manipulator 24 is now positioned below the stack of plates. It is noted that the moveable manipulator 24 may also be positioned at different locations with respect to the stack of plates. The stack of plates 2 is being placed in the plate loosening device 50 while the elevator 44 is ready to receive the stack of plates 2. The plate loosening device is depicted in an open state to allow the placement of the stack of plates in the plate loosening device.

Figure 4C:
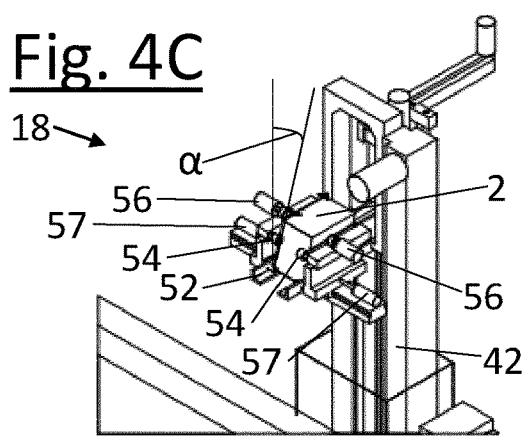

Turning to FIG. 4C, the plate loosening device 50 is depicted in a closed state, wherein actuators 57 have closed the plate loosening device, engaging the stack of plates 2. In this embodiment, the plate loosening device 50 comprises guide bodies 54 and corresponding actuators 56. While the stack of plates is supported by the bottom wall 52, the actuator 56 drives the guide body 54 and moves the guide body 54 to pivot the stack of plates over an angle α with respect to a neutral position. The movement of the guide bodies 54 pivots the plates of the stack of plates 2, shearing the plates with respect to each other and thereby loosening them. Stopping bodies 59 (depicted in FIG. 4B) are located near the bottom wall, wherein the stopping bodies restrict the movement of the stack of plates in the plate loosening device when the plate loosening device is in the closed state.

Figure 4D:
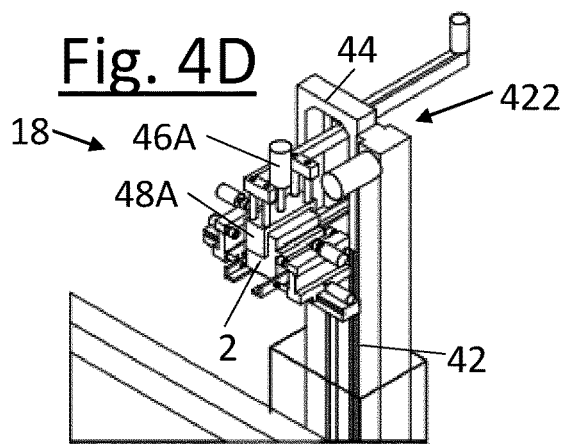

Turning to FIG. 4D, an intermediate body 48A and a corresponding actuator 46A have engaged a stack of plates 2 that has been loosened and the intermediate body 48A and actuator 46A are ready to move the stack of plates into the elevator 44. The plate loosening device is shown in the open state.

Figure 4E:
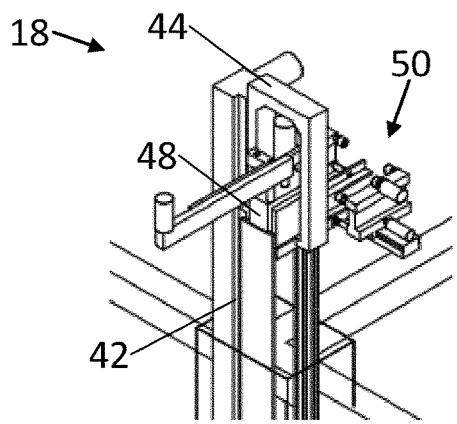

In FIG. 4E, the view has been rotated 180 degrees and the intermediate body 48A and the actuator 46A have moved the stack of plates into the elevator 44. The elevator 44 is located at the upper extremity 422 of the guide structure 42.

Figure 4F:
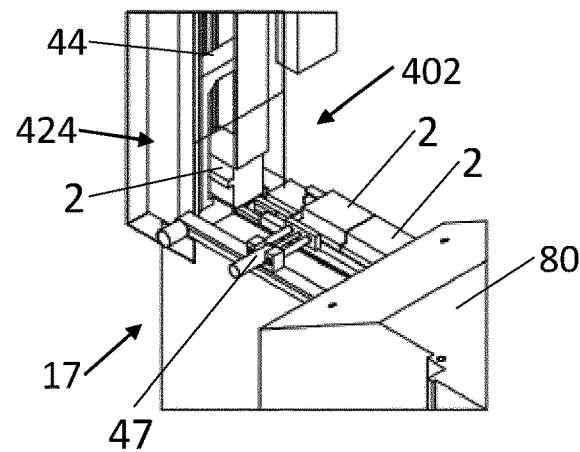

Moving to FIG. 4F, the view has been rotated clockwise 90 degrees and the exit 402 of the conveyor 40 is shown. The elevator 44 is now located at the lower extremity 424 of the guide structure 42 and the target location 17 is depicted. Here, two stacks of plates 2 are already being fed to the machine 80 and are kept in place by a filler assembly 47.

Figure 4G:
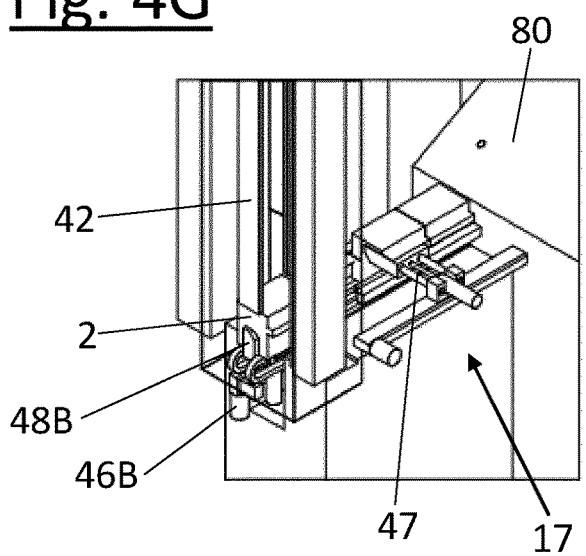
Figure 4H:
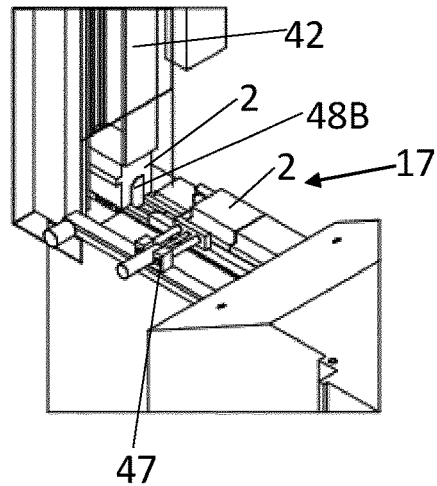

FIGS. 4G and 4H show the same situation seen from two different views. The stack of plates 2 is still located in the conveyor at the lower extremity of the guide structure 42. A second intermediate body 48B and a second actuator 46B have engaged the stack of plates 2 and are ready to move the stack of plates out of the conveyor.

Figure 4I:
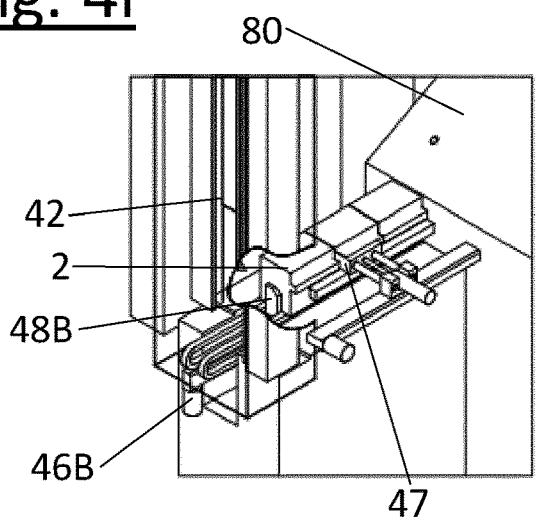
Figure 4J:
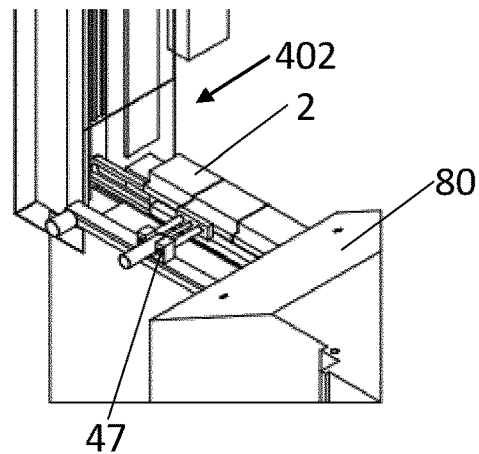

FIGS. 4I and 4J show the same situation seen from two different views. The stack of plates has been moved out of the conveyor by the second intermediate body 48B and the second actuator 46B but has not yet been engaged by the filler assembly 47.

Figure 4K:
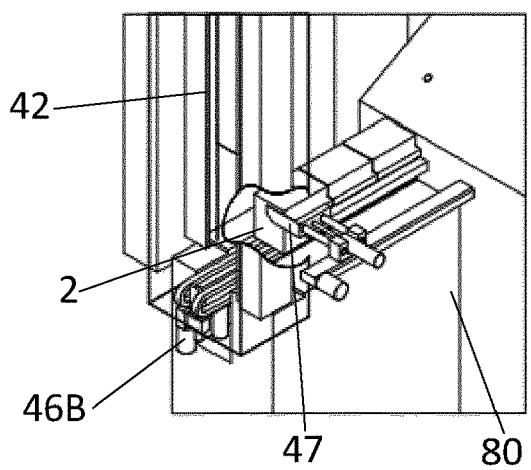
Figure 4L:
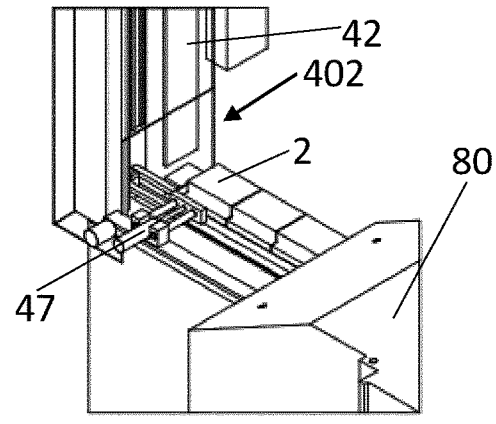

FIGS. 4K and 4L show the same situation seen from two different views. The filler assembly 47 has engaged the stack of plates 2 and can now feed the plates to the machine 80. The plates of the stacks of plates are oriented on edge when being fed to the machine. In FIG. 4K, part of the conveyor is omitted from the drawings in order to better be able to view the filler assembly 47.

Figure 5:
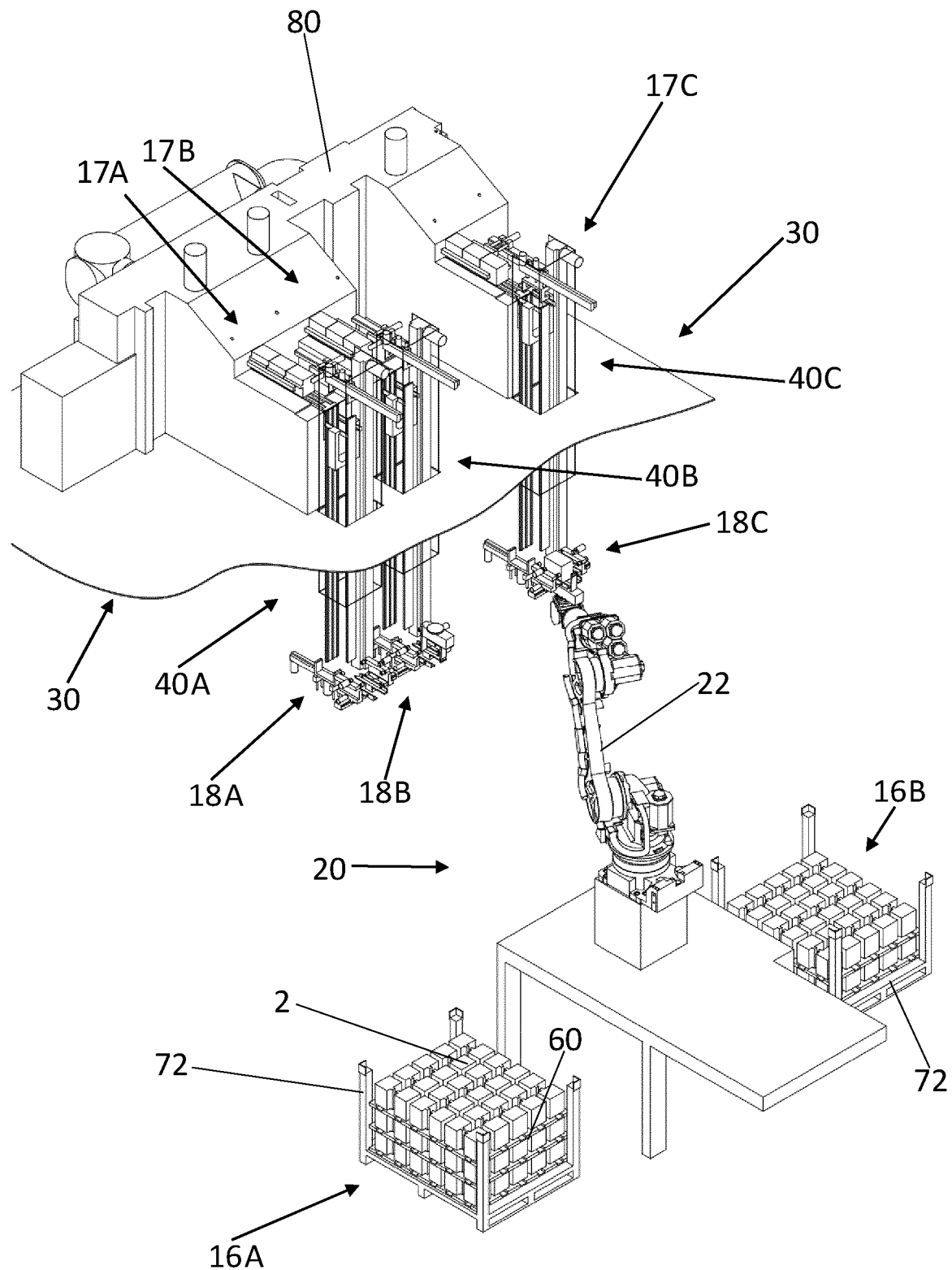
FIG. 5 shows another embodiment of the invention in isometric view.

FIG. 5 depicts another embodiment of the invention wherein the first zone 12 and the second zone 14 are located on different floors of a building. In the depicted embodiment, the first zone 12 comprises the arrival location 16A, 16B, the moving assembly 20 and its range of motion, the intermediate location 18A, 18B, 18C, and the support bodies 60 supported by the pallet 72. The second zone 14 comprises the machine 80, the target location 17A, 17B, 17C and is located on a floor that is higher than the floor where the first zone is located. In this embodiment the first zone 12 is separated from the second zone 14 by a floor of a building. Herein, the separation 30 comprises the ceiling of the floor where the first zone 12 is located, i.e. the floor where the second zone 14 is located.

By placing the arrival location on another floor than the machine, the arrival location may be approached from all directions instead of only from one side. The latter being the case when the arrival location and the machine are on the same floor.

Turning to FIGS. 6 and 7, the stack manipulation system 10 as a whole is shown and a more detailed view of a pallet 72 with stacks of plates 2 and support bodies 60 is shown.

In this embodiment, the moveable manipulator 24 is configured to engage the support body 60 through a recess 64 to move the support body from an arrival position 16B to a support body storage position 66.

Figure 7A:
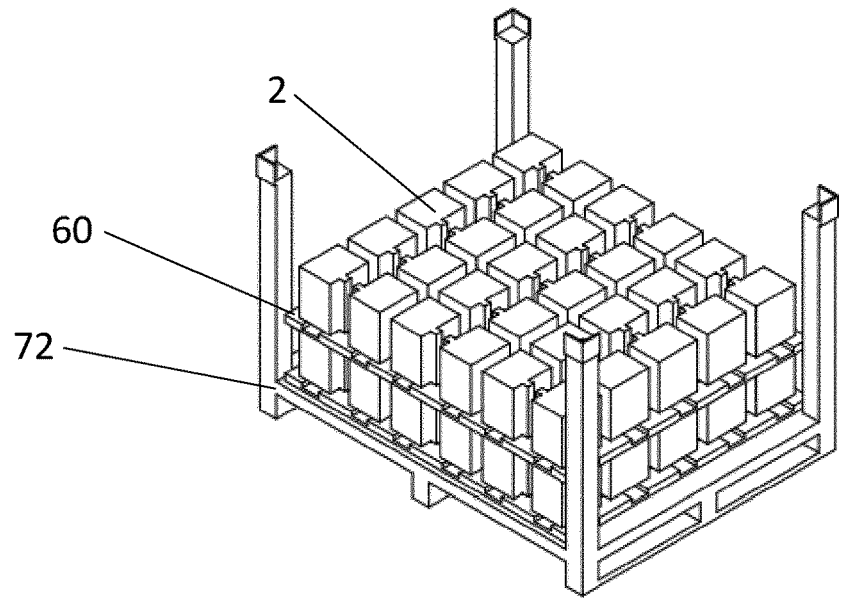
FIGS. 7A-7C show an embodiment of a support structure and pallet in isometric view.
Figure 7B:
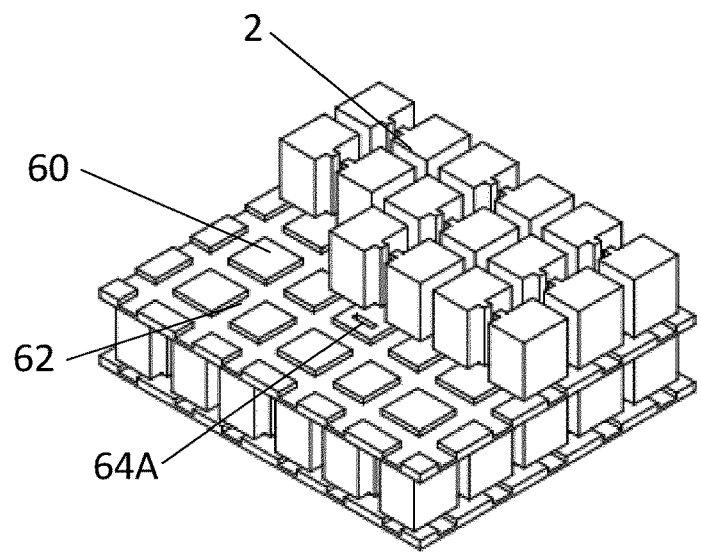
Figure 7C:
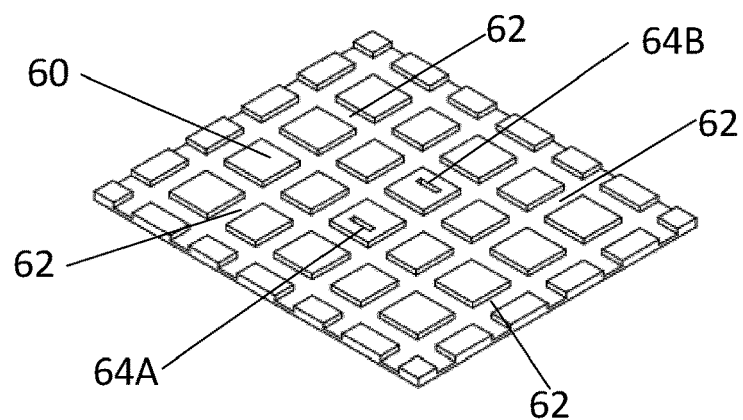

FIGS. 7A-7C show how the stacks of plates 2 arrives in the arrival location 16A, 16B. A first support body 60 is located on a pallet 72 and multiple stacks of plates 2 are located on said support body 60. On those stacks of plates 2, another support body 60 is located that in turn supports multiple stacks of plates 2. The depicted support body comprises lateral and longitudinal slots 62 that are dimensioned to accommodate the moveable manipulator, and in particular the extending member of the moveable manipulator. FIG. 7C shows the support body 60 standing alone and also depicts two recesses 64A, 64B wherein the length and width of the at least one recess are larger than the length and width of the at least one extending member. This way, the extending member can engage the support body 60 in order to move it to the support body storage position. It will be understood that various other ways of engagement are possible such as, but not limited to, a vacuum gripper or a clamping assembly.

Figure 8A:
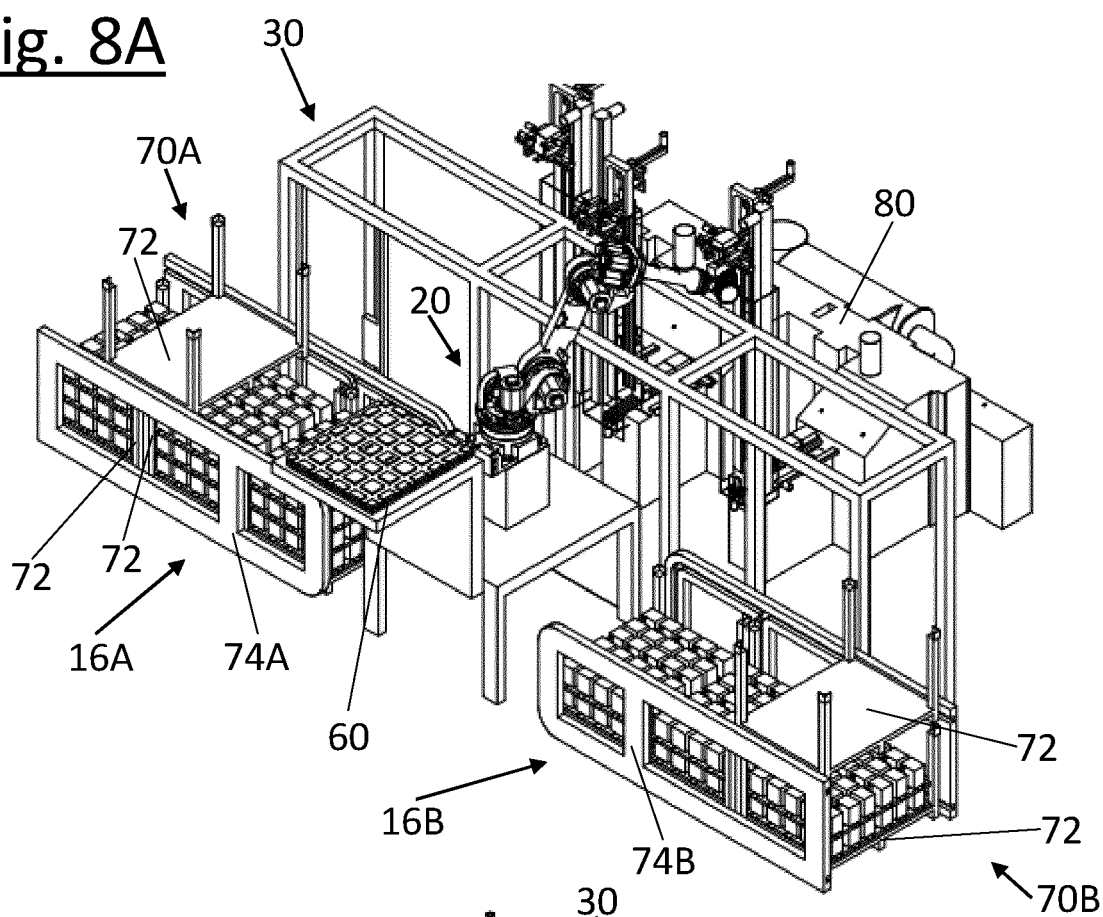
FIGS. 8A and 8B shows two embodiments of a pallet transport assembly in isometric view.
Figure 8B:
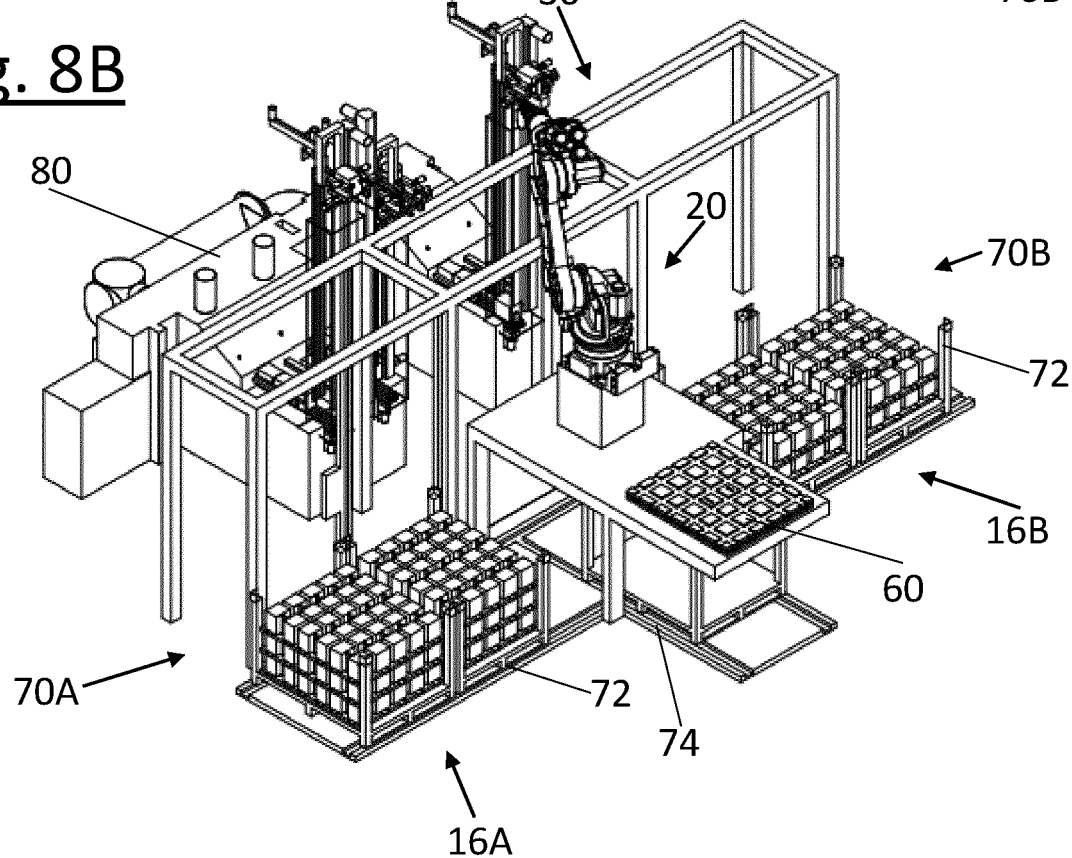

FIGS. 8A and 8B depict different embodiments of the invention, wherein the stack manipulation system further comprises a pallet transport assembly 70. FIG. 8A depicts a pallet transport assembly 70A, 70B where a pallet 72 supports stacks of plates in the arrival position 16A, 16B. The pallet transport assembly 70A, 70B comprises a pallet conveyor 74A, 74B configured to move pallets to and away from the arrival location. The pallets 72 with stacks of plates 2 move towards the arrival location 16A, 16B in the pallet conveyor 74A, 74B and the empty pallets 72 move away from the arrival location 16A, 16B in the opposite direction of their arrival and move over the pallets with stacks of plates.

The embodiment depicted in FIG. 8B shows a pallet transport assembly 70 where a pallet 72 supports stacks of plates in the arrival position 16A, 16B. The pallet transport assembly comprises a pallet conveyor 74 configured to move pallets to and away from the arrival location. The pallets 72 with stacks of plates 2 move towards the arrival location 16A, 16B in the pallet conveyor 74 and the empty pallets 72 move away from the arrival location 16A, 16B in a direction orthogonal to the arrival directions.

In an embodiment of the invention, the depicted machine is a battery plate arranging device, the battery plate arranging device comprising at least a first target location 17A for a stack of plates of a first kind and a second target location 17B for a stack of plates of a second kind.

The terms "a" or "an", as used herein, are defined as one or more than one. The term plurality, as used herein, is defined as two or more than two. The term another herein, is defined as at least a second or more. The terms including and/or having, as used herein, are defined as comprising i.e., open language, not excluding other elements or steps.

Any reference signs in the claims should not be construed as limiting the scope of the claims or the invention. It will be recognized that a specific embodiment as claimed may not achieve all of the stated objects.

The mere fact that certain measures are recited in mutually different dependent claims does not indicate that a combination of these measures cannot be used to advantage.

White lines between text paragraphs in the text above indicate that the technical features presented in the paragraph may be considered independent from technical features discussed in a preceding paragraph or in a subsequent paragraph.

The invention claimed is:

1. A stack manipulating system configured to move a stack of plates, in particular lead battery plates, from at least one arrival location to at least one target location at a machine where the plates are to be processed, and wherein the stack manipulating system comprises:
   a first zone comprising the at least one arrival location and a non-static moving assembly having a range of motion, wherein the complete range of motion is located within the first zone,
   a second zone comprising the at least one target location and the machine, wherein the second zone is configured to accommodate an operator,
   a separation, separating the second zone from the first zone, the separation being configured for preventing the operator to move into the first zone,
   at least one conveyor traversing the separation, the at least one conveyor comprising an entrance in at least one intermediate location located in the first zone and an exit located in the second zone,
   wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and
   wherein the moving assembly comprises a moveable manipulator, wherein the moveable manipulator comprises an engagement member which is configured to engage the stack of plates in the at least one arrival location, and wherein the moveable manipulator is configured to move the stack of plates from the at least one arrival location to the at least one intermediate location.

2. A stack manipulating system configured to move a stack of plates, in particular lead battery plates, from at least one arrival location to at least one target location at a machine where the plates are to be processed, and wherein the stack manipulating system comprises:
   a first zone comprising the at least one arrival location and a non-static moving assembly having a range of motion, wherein the complete range of motion is located within the first zone,
   a second zone comprising the at least one target location and the machine, wherein the second zone is configured to accommodate an operator,
   a separation, separating the second zone from the first zone, the separation being configured for preventing the operator to move into the first zone,
   at least one conveyor traversing the separation, the at least one conveyor comprising an entrance in at least one intermediate location located in the first zone and an exit located in the second zone,
   wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and
   wherein the at least one intermediate location is located at a first vertical distance from the at least one arrival location and at a second vertical distance from the at least one target location, wherein the moving assembly is configured to move a stack of plates over the first vertical distance to the at least one intermediate location, and wherein the at least one conveyor is configured to move the stack of plates over the second vertical distance to the at least one target location, wherein the moving assembly and the at least one conveyor work together to move the stack of plates past the separation and towards the machine.

3. A stack manipulating system configured to move a stack of plates, in particular lead battery plates, from at least one arrival location to at least one target location at a machine where the plates are to be processed, and wherein the stack manipulating system comprises:
a first zone comprising the at least one arrival location and a non-static moving assembly having a range of motion, wherein the complete range of motion is located within the first zone,
a second zone comprising the at least one target location and the machine, wherein the second zone is configured to accommodate an operator,
a separation, separating the second zone from the first zone, the separation being configured for preventing the operator to move into the first zone,
at least one conveyor traversing the separation, the at least one conveyor comprising an entrance in at least one intermediate location located in the first zone and an exit located in the second zone,
wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and
further comprising at least one plate loosening device, configured to loosen the plates of a stack, wherein the at least one plate loosening device comprises:
a bottom wall configured to support a stack of plates,
at least one guide body, wherein the guide body is moveably connected to the bottom wall, and being configured to abut against the stack of plates,
a guide body drive system being connected to the at least one guide body and comprising at least one actuator configured to move the at least one guide body,
wherein the guide body drive system is configured to move the at least one guide body to pivot the stack of plates over an angle with respect to a neutral position, wherein the movement of the at least one guide body pivots the plates of the stack of plates, shearing the plates with respect to each other, wherein the plate loosening device is located at the entrance or at the exit of the at least one conveyor.

4. The stack manipulation system according to claim 2, comprising a plate loosening device comprising a wall, wherein an actuator and a guide body accelerate and/or decelerate the stack of plates against the wall, in particular the actuator and the guide body are configured to separate the plates of a stack by letting the stack fall freely on the wall.

5. The stack manipulation system according to claim 3, wherein the plate loosening device is located at the entrance or at the exit of the at least one conveyor.

6. A stack manipulating system configured to move a stack of plates, in particular lead battery plates, from at least one arrival location to at least one target location at a machine where the plates are to be processed, and wherein the stack manipulating system comprises:
a first zone comprising the at least one arrival location and a non-static moving assembly having a range of motion, wherein the complete range of motion is located within the first zone,
a second zone comprising the at least one target location and the machine, wherein the second zone is configured to accommodate an operator
a separation, separating the second zone from the first zone, the separation being configured for preventing the operator to move into the first zone,
at least one conveyor traversing the separation, the at least one conveyor comprising an entrance in at least one intermediate location located in the first zone and an exit located in the second zone,
wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and
wherein the moving assembly comprises a robot arm and the conveyor does not comprise a robot arm.

7. A stack manipulating system configured to move a stack of plates, in particular lead battery plates, from at least one arrival location to at least one target location at a machine where the plates are to be processed, and wherein the stack manipulating system comprises:
a first zone comprising the at least one arrival location and a non-static moving assembly having a range of motion, wherein the complete range of motion is located within the first zone,
a second zone comprising the at least one target location and the machine, wherein the second zone is configured to accommodate an operator,
a separation, separating the second zone from the first zone, the separation being configured for preventing the operator to move into the first zone, at least one conveyor traversing the separation, the at least one conveyor comprising an entrance in at least one intermediate location located in the first zone and an exit located in the second zone,
wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and
wherein the moving assembly comprises a crane.

8. A stack manipulating system configured to move a stack of plates, in particular lead battery plates, from at least one arrival location to at least one target location at a machine where the plates are to be processed, and wherein the stack manipulating system comprises:
a first zone comprising the at least one arrival location and a non-static moving assembly having a range of motion, wherein the complete range of motion is located within the first zone,
a second zone comprising the at least one target location and the machine, wherein the second zone is configured to accommodate an operator,
a separation, separating the second zone from the first zone, the separation being configured for preventing the operator to move into the first zone, at least one conveyor traversing the separation, the at least one conveyor comprising an entrance in at least one intermediate location located in the first zone and an exit located in the second zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and wherein the guide structure comprises one or more tracks or a conveyor belt.

9. A stack manipulating system configured to move a stack of plates, in particular lead battery plates, from at least one arrival location to at least one target location at a machine where the plates are to be processed, and wherein the stack manipulating system comprises:

a first zone comprising the at least one arrival location and a non-static moving assembly having a range of motion, wherein the complete range of motion is located within the first zone, a second zone comprising the at least one target location and the machine, wherein the second zone is configured to accommodate an operator, a separation, separating the second zone from the first zone, the separation being configured for preventing the operator to move into the first zone, at least one conveyor traversing the separation, the at least one conveyor comprising an entrance in at least one intermediate location located in the first zone and an exit located in the second zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and wherein the moving assembly and/or the conveyor comprises at least one rotational manipulator which provides at least one rotary degree of freedom for the stack of plates, wherein the at least one rotational manipulator is rotatable to change the orientation of a stack of plates between the arrival location and the target location.

10. The stack manipulation system according to claim 1, further comprising a support body and a stack of plates located at the arrival location, wherein the support body defines a plurality of longitudinal and lateral slots in an upper surface to accommodate the moveable manipulator, allowing the manipulator to reach underneath a stack that is positioned on the body, wherein the width of the slots is larger than the width of the moveable manipulator.

11. The stack manipulation system according to claim 1, wherein the support body comprises at least one recess in the upper surface other than the longitudinal and lateral slots and the moveable manipulator comprises at least one extending member, wherein the length and width of the at least one recess are larger than the length and width of the at least one extending member, wherein the moveable manipulator is configured to engage the support body at least through the at least one recess to move the support body from an arrival position to a support body storage position.

12. A stack manipulating system configured to move a stack of plates, in particular lead battery plates, from at least one arrival location to at least one target location at a machine where the plates are to be processed, and wherein the stack manipulating system comprises:

a first zone comprising the at least one arrival location and a non-static moving assembly having a range of motion, wherein the complete range of motion is located within the first zone, a second zone comprising the at least one target location and the machine, wherein the second zone is configured to accommodate an operator, a separation, separating the second zone from the first zone, the separation being configured for preventing the operator to move into the first zone, at least one conveyor traversing the separation, the at least one conveyor comprising an entrance in at least one intermediate location located in the first zone and an exit located in the second zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and wherein the at least one conveyor comprises an elevator and the intermediate location is located at an upper extremity or at a lower extremity of the guide structure and the target location is located at an opposite extremity of the guide structure, wherein the elevator travels along the guide structure.

13. The stack manipulation system according to claim 12, wherein the elevator is driven by an elevator system to separate the plates of a stack by accelerating and/or decelerating the stack of plates against a fixed structure, in particular the elevator system being configured to separate the plates of a stack by letting the stack fall freely on a bottom wall.

14. A stack manipulating system configured to move a stack of plates, in particular lead battery plates, from at least one arrival location to at least one target location at a machine where the plates are to be processed, and wherein the stack manipulating system comprises:

a first zone comprising the at least one arrival location and a non-static moving assembly having a range of motion, wherein the complete range of motion is located within the first zone, a second zone comprising the at least one target location and the machine, wherein the second zone is configured to accommodate an operator, a separation, separating the second zone from the first zone, the separation being configured for preventing the operator to move into the first zone, at least one conveyor traversing the separation, the at least one conveyor comprising an entrance in at least one intermediate location located in the first zone and an exit located in the second zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and wherein the at least one conveyor comprises at least one actuator and at least one intermediate body, wherein the at least one actuator and the at least one intermediate body are configured to move a stack of plates from the at least one intermediate location into the at least one conveyor and/or to move the stack of plates out of the at least one conveyor.

15. A stack manipulating system configured to move a stack of plates, in particular lead battery plates, from at least one arrival location to at least one target location at a machine where the plates are to be processed, and wherein the stack manipulating system comprises:
- a first zone comprising the at least one arrival location and a non-static moving assembly having a range of motion, wherein the complete range of motion is located within the first zone,
- a second zone comprising the at least one target location and the machine, wherein the second zone is configured to accommodate an operator,
- a separation, separating the second zone from the first zone, the separation being configured for preventing the operator to move into the first zone,
- at least one conveyor traversing the separation, the at least one conveyor comprising an entrance in at least one intermediate location located in the first zone and an exit located in the second zone,
- wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and
- wherein the separation comprises a protection fence with overhang, wherein the protection fence with overhang creates an area below the overhang in the second zone to accommodate the operator, wherein the moving assembly and the conveyor are configured to move the stack of plates over the protection fence.

16. A stack manipulating system configured to move a stack of plates, in particular lead battery plates, from at least one arrival location to at least one target location at a machine where the plates are to be processed, and wherein the stack manipulating system comprises:
- a first zone comprising the at least one arrival location and a non-static moving assembly having a range of motion, wherein the complete range of motion is located within the first zone,
- a second zone comprising the at least one target location and the machine, wherein the second zone is configured to accommodate an operator,
- a separation, separating the second zone from the first zone, the separation being configured for preventing the operator to move into the first zone,
- at least one conveyor traversing the separation, the at least one conveyor comprising an entrance in at least one intermediate location located in the first zone and an exit located in the second zone,
- wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and
- wherein the separation comprises a floor of a building, wherein the first zone is located on the floor of the building and the second zone is located on a lower floor of the building, or wherein the separation comprises a floor of a building, wherein the second zone is located on the floor of the building and the first zone is located on a lower floor of the building.

17. A stack manipulating system configured to move a stack of plates, in particular lead battery plates, from at least one arrival location to at least one target location at a machine where the plates are to be processed, and wherein the stack manipulating system comprises:
- a first zone comprising the at least one arrival location and a non-static moving assembly having a range of motion, wherein the complete range of motion is located within the first zone,
- a second zone comprising the at least one target location and the machine, wherein the second zone is configured to accommodate an operator,
- a separation, separating the second zone from the first zone, the separation being configured for preventing the operator to move into the first zone,
- at least one conveyor traversing the separation, the at least one conveyor comprising an entrance in at least one intermediate location located in the first zone and an exit located in the second zone,
- wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, wherein the moving assembly comprises moving parts, and wherein the moving parts are configured to stay outside the second zone, and
- wherein the machine is a battery plate arranging device, the battery plate arranging device comprising at least a first target location for a stack of battery plates of a first kind and a second target location for a stack of battery plates of a second kind, wherein the battery plate arranging device comprises a first positioning assembly and a second positioning assembly that alternatively position battery plates of the first kind and the second kind behind each other, creating a stack of alternating battery plates of the first kind and plates of the second kind, wherein the machine comprises a conveyor configured to move a stack of alternating battery plates out of the machine after having been arranged to be installed in a battery.

18. A method for manipulating a stack of plates configured to move a stack of plates, in particular lead battery plates, from at least one arrival location to at least one target location at a machine, and wherein the stack manipulating system comprises:
- a first zone comprising the at least one arrival location and a moving assembly and a complete range of motion of the moving assembly,
- a second zone comprising the at least one target location and the machine, wherein the second zone is configured to accommodate an operator, a separation, separating the first zone from the second zone, the separation being configured for preventing the operator to move into the first zone, at least one conveyor extending through or over the separation, the at least one conveyor comprising an entrance in at least one intermediate location and an exit located at the at least one target location, wherein the intermediate location is located in the first zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, the method comprising the steps:
- a) engaging the stack of plates with the moving assembly in the at least one arrival location in the first zone,
- b) moving the stack of plates from the at least one arrival location to the at least one intermediate location in the first zone with the moving assembly,
- c) moving the stack of plates from the at least one intermediate location to the at least one target location in the second zone with the at least one conveyor, wherein the moving assembly comprises moving parts, and wherein the moving parts stay outside the second zone, and wherein the moving assembly comprises a moveable manipulator, wherein the moveable manipulator comprises an engagement member which, during step a), engages the stack of plates in the at least one arrival location, and wherein, during step b), the moving assembly moves the stack of plates from the at least one arrival location to the at least one intermediate location.

19. A method for manipulating a stack of plates configured to move a stack of plates, in particular lead battery plates, from at least one arrival location to at least one target location at a machine, and wherein the stack manipulating system comprises:

a first zone comprising the at least one arrival location and a moving assembly and a complete range of motion of the moving assembly, a second zone comprising the at least one target location and the machine, wherein the second zone is configured to accommodate an operator, a separation, separating the first zone from the second zone, the separation being configured for preventing the operator to move into the first zone, at least one conveyor extending through or over the separation, the at least one conveyor comprising an entrance in at least one intermediate location and an exit located at the at least one target location, wherein the intermediate location is located in the first zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, the method comprising the steps:
a) engaging the stack of plates with the moving assembly in the at least one arrival location in the first zone,
b) moving the stack of plates from the at least one arrival location to the at least one intermediate location in the first zone with the moving assembly
c) moving the stack of plates from the at least one intermediate location to the at least one target location in the second zone with the at least one conveyor, wherein the moving assembly comprises moving parts, and wherein the moving parts stay outside the second zone, and wherein the at least one intermediate location is located at a first vertical distance from the at least one arrival location and a second vertical distance from the at least one target location, wherein during step b) the moving assembly moves a stack of plates over the first vertical distance to the at least one intermediate location, and wherein during step c) the at least one conveyor moves the stack of plates over the second vertical distance to the at least one target location, wherein the moving assembly and the at least one conveyor work together to move the stack of plates past the separation and towards the machine.

20. A method for manipulating a stack of plates configured to move a stack of plates, in particular lead battery plates, from at least one arrival location to at least one target location at a machine, and wherein the stack manipulating system comprises:

a first zone comprising the at least one arrival location and a moving assembly and a complete range of motion of the moving assembly a second zone comprising the at least one target location and the machine, wherein the second zone is configured to accommodate an operator, a separation, separating the first zone from the second zone, the separation being configured for preventing the operator to move into the first zone, at least one conveyor extending through or over the separation, the at least one conveyor comprising an entrance in at least one intermediate location and an exit located at the at least one target location, wherein the intermediate location is located in the first zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, the method comprising the steps:
a) engaging the stack of plates with the moving assembly in the at least one arrival location in the first zone,
b) moving the stack of plates from the at least one arrival location to the at least one intermediate location in the first zone with the moving assembly
c) moving the stack of plates from the at least one intermediate location to the at least one target location in the second zone with the at least one conveyor, wherein the moving assembly comprises moving parts, and wherein the moving parts stay outside the second zone, and wherein the stack manipulation system comprises at least one plate loosening device, wherein the plate loosening device loosens the plates of a stack from each other before arriving at the at least one target location, wherein the at least one plate loosening device comprises a guide body drive system and at least one guide body.

21. A method for manipulating a stack of plates configured to move a stack of plates, in particular lead battery plates, from at least one arrival location to at least one target location at a machine, and wherein the stack manipulating system comprises:

a first zone comprising the at least one arrival location and a moving assembly and a complete range of motion of the moving assembly, a second zone comprising the at least one target location and the machine, wherein the second zone is configured to accommodate an operator, a separation, separating the first zone from the second zone, the separation being configured for preventing the operator to move into the first zone, at least one conveyor extending through or over the separation, the at least one conveyor comprising an entrance in at least one intermediate location and an exit located at the at least one target location, wherein the intermediate location is located in the first zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, the method comprising the steps:

a) engaging the stack of plates with the moving assembly in the at least one arrival location in the first zone, b) moving the stack of plates from the at least one arrival location to the at least one intermediate location in the first zone with the moving assembly, c) moving the stack of plates from the at least one intermediate location to the at least one target location in the second zone with the at least one conveyor wherein the moving assembly comprises moving parts, and wherein the moving parts stay outside the second zone, and wherein the moving assembly comprises a robot arm and the conveyor does not comprise a robot arm.

22. A method for manipulating a stack of plates configured to move a stack of plates, in particular lead battery plates, from at least one arrival location to at least one target location at a machine, and wherein the stack manipulating system comprises:

a first zone comprising the at least one arrival location and a moving assembly and a complete range of motion of the moving assembly, a second zone comprising the at least one target location and the machine, wherein the second zone is configured to accommodate an operator, a separation, separating the first zone from the second zone, the separation being configured for preventing the operator to move into the first zone, at least one conveyor extending through or over the separation, the at least one conveyor comprising an entrance in at least one intermediate location and an exit located at the at least one target location, wherein the intermediate location is located in the first zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, the method comprising the steps:

a) engaging the stack of plates with the moving assembly in the at least one arrival location in the first zone, b) moving the stack of plates from the at least one arrival location to the at least one intermediate location in the first zone with the moving assembly, c) moving the stack of plates from the at least one intermediate location to the at least one target location in the second zone with the at least one conveyor, wherein the moving assembly comprises moving parts, and wherein the moving parts stay outside the second zone, and wherein the moving assembly and/or the conveyor comprises at least one rotational manipulator which provides at least one rotary degree of freedom, wherein the moving assembly and/or the conveyor changes the orientation of a stack of plates after engaging the stack of plates.

23. A method for manipulating a stack of plates configured to move a stack of plates, in particular lead battery plates, from at least one arrival location to at least one target location at a machine, and wherein the stack manipulating system comprises:

a first zone comprising the at least one arrival location and a moving assembly and a complete range of motion of the moving assembly, a second zone comprising the at least one target location and the machine, wherein the second zone is configured to accommodate an operator, a separation, separating the first zone from the second zone, the separation being configured for preventing the operator to move into the first zone, at least one conveyor extending through or over the separation, the at least one conveyor comprising an entrance in at least one intermediate location and an exit located at the at least one target location, wherein the intermediate location is located in the first zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, the method comprising the steps:

a) engaging the stack of plates with the moving assembly in the at least one arrival location in the first zone, b) moving the stack of plates from the at least one arrival location to the at least one intermediate location in the first zone with the moving assembly c) moving the stack of plates from the at least one intermediate location to the at least one target location in the second zone with the at least one conveyor, wherein the moving assembly comprises moving parts, and wherein the moving parts stay outside the second zone, and wherein the at least one conveyor comprises an elevator and the intermediate location is located at a lower extremity of the guide structure and the target location is located at an upper extremity of the guide structure.

24. A method for manipulating a stack of plates configured to move a stack of plates, in particular lead battery plates, from at least one arrival location to at least one target location at a machine, and wherein the stack manipulating system comprises:

a first zone comprising the at least one arrival location and a moving assembly and a complete range of motion of the moving assembly, a second zone comprising the at least one target location and the machine, wherein the second zone is configured to accommodate an operator, a separation, separating the first zone from the second zone, the separation being configured for preventing the operator to move into the first zone, at least one conveyor extending through or over the separation, the at least one conveyor comprising an entrance in at least one intermediate location and an exit located at the at least one target location, wherein the intermediate location is located in the first zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, the method comprising the steps:

a) engaging the stack of plates with the moving assembly in the at least one arrival location in the first zone, b) moving the stack of plates from the at least one arrival location to the at least one intermediate location in the first zone with the moving assembly, c) moving the stack of plates from the at least one intermediate location to the at least one target location in the second zone with the at least one conveyor, wherein the moving assembly comprises moving parts, and wherein the moving parts stay outside the second zone, and wherein the separation is an elongated structure creating a safe side in the second zone which is configured to accommodate an operator and to keep the operator safe from moving parts, the safe side corresponding to the second zone.

25. A method for manipulating a stack of plates configured to move a stack of plates, in particular lead battery plates, from at least one arrival location to at least one target location at a machine, and wherein the stack manipulating system comprises:

a first zone comprising the at least one arrival location and a moving assembly and a complete range of motion of the moving assembly, a second zone comprising the at least one target location and the machine wherein the second zone is configured to accommodate an operator, a separation, separating the first zone from the second zone, the separation being configured for preventing the operator to move into the first zone, at least one conveyor extending through or over the separation, the at least one conveyor comprising an entrance in at least one intermediate location and an exit located at the at least one target location, wherein the intermediate location is located in the first zone, wherein the conveyor defines a trajectory between the entrance and the exit and comprises a guide structure which extends between the entrance and the exit along said trajectory and which guides the stack of plates along said trajectory, and wherein, at least in the second zone, the guide structure is a static structure, the method comprising the steps:

a) engaging the stack of plates with the moving assembly in the at least one arrival location in the first zone, b) moving the stack of plates from the at least one arrival location to the at least one intermediate location in the first zone with the moving assembly, c) moving the stack of plates from the at least one intermediate location to the at least one target location in the second zone with the at least one conveyor, wherein the moving assembly comprises moving parts, and wherein the moving parts stay outside the second zone, and wherein the machine is a battery plate arranging device, the battery plate arranging device comprising at least a first target location for a stack of plates of a first kind and a second target location for a stack of plates of a second kind, wherein the battery plate arranging device comprises a first positioning assembly and a second positioning assembly that alternately position plates of the first kind and the second kind behind each other, creating a stack of alternating plates of the first kind and plates of the second kind, wherein the machine comprises a conveyor that moves the stack of alternating plates out of the machine after having been arranged to be installed in a battery.

* * * * *